United States Patent [19]

Maynard et al.

[11] 3,948,357
[45] Apr. 6, 1976

[54] TRANSPORTATION SYSTEM WITH DECELERATING CONTROL

[75] Inventors: John T. Maynard, New Berlin; Christopher Young, Glendale, both of Wis.

[73] Assignee: Armor Elevator Company, Inc., Louisville, Ky.

[22] Filed: Apr. 29, 1974

[21] Appl. No.: 465,272

[52] U.S. Cl. .............................................. 187/29 R
[51] Int. Cl.² ........................................... B66B 1/30
[58] Field of Search ....................................... 187/29

[56] References Cited
UNITED STATES PATENTS

| | | | |
|---|---|---|---|
| 2,674,348 | 4/1954 | Santini et al. | 187/29 |
| 2,804,943 | 9/1957 | Spiess | 187/29 |
| 2,821,672 | 1/1958 | Sichling et al. | 187/29 |
| 2,846,026 | 8/1958 | Gott et al. | 187/29 |
| 2,918,987 | 12/1959 | Haase et al. | 187/29 |
| 3,240,290 | 3/1966 | Pohlman | 187/29 |
| 3,297,110 | 1/1967 | Bagnasco | 187/29 |
| 3,428,149 | 2/1969 | Burch | 187/29 |
| 3,523,232 | 8/1970 | Hall et al. | 187/29 |
| 3,815,711 | 6/1974 | Hoelscher | 187/29 |

Primary Examiner—James R. Scott
Assistant Examiner—W. E. Duncanson, Jr.
Attorney, Agent, or Firm—Andrus, Sceales, Starke & Sawall

[57] ABSTRACT

A solid state static converter receives a three-phase A.C. input and directly supplies direct current to a D.C. motor operating a traction sheave to control the movement of an elevator car in response to an error signal derived by the selective summation of a speed signal from a tachometer and a pair of vehicle speed command signals. One command signal is a function of the commanded velocity versus time and operatively controls the system during acceleration, constant velocity and a portion of deceleration. The other command signal is a function of the commanded velocity versus time as modified by the sensed position of the car and solely operatively controls the system during a portion of deceleration to stop the vehicle at a selected landing. The modified decelerating vehicle speed command signal is provided by an integrating circuit receiving stepped inputs as a function of a preconditioning input and the command signal input from a feedback circuit and modified in accordance with the sensed position of the vehicle to provide a vehicle command signal having a predetermined plurality of slopes.

27 Claims, 3 Drawing Figures

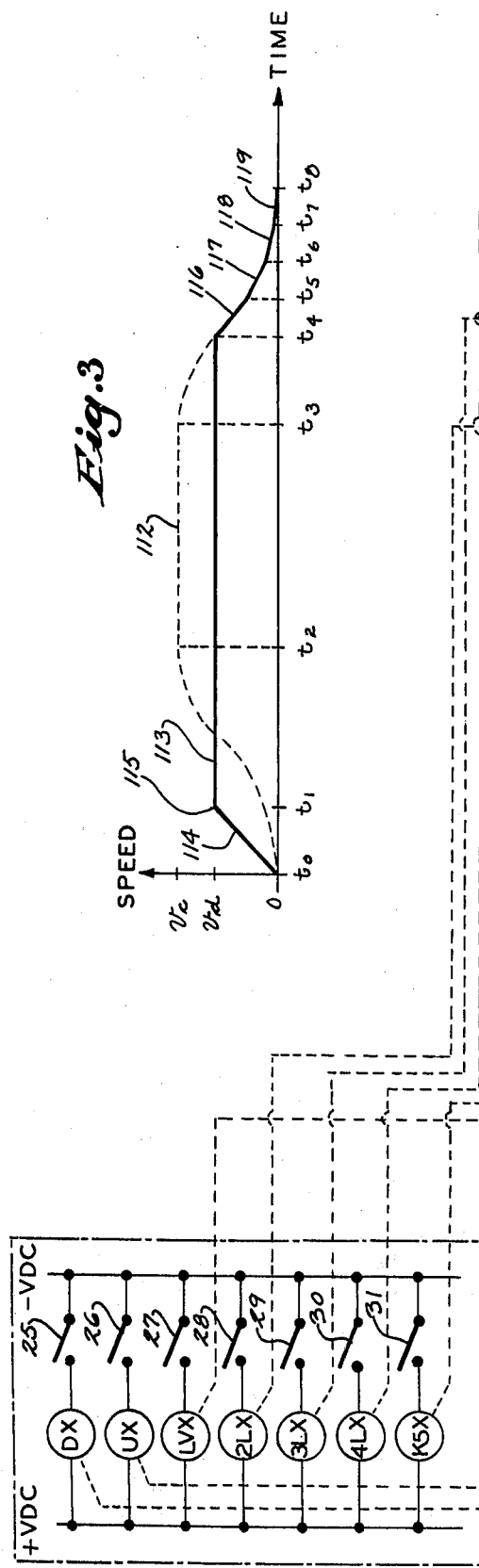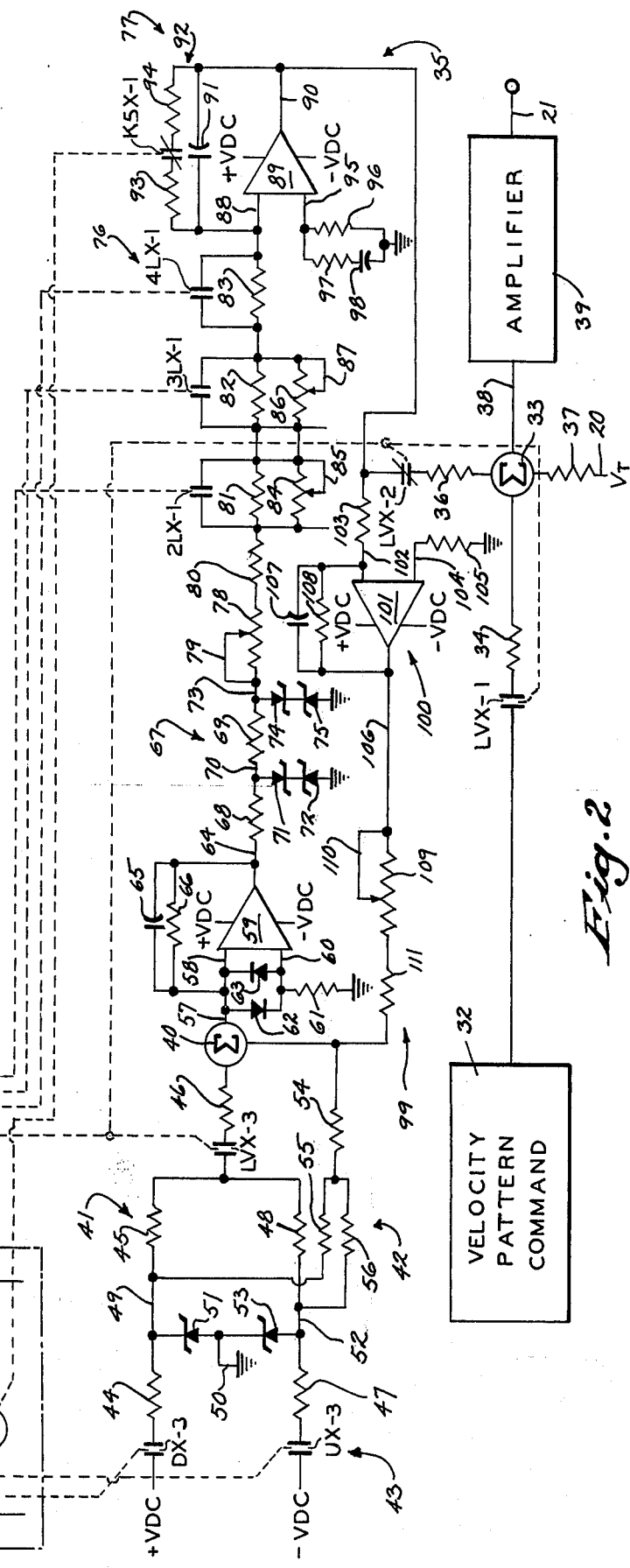

TRANSPORTATION SYSTEM WITH DECELERATING CONTROL

BACKGROUND OF THE INVENTION

This invention relates to a transportation system and specifically to an apparatus which supplies a vehicle command signal operatively decelerating the vehicle to a selected landing at which a stop is to be made.

Many types of command signals have been utilized within motor control circuits for comparison with signals which represent the actual operation of the motor and the objects they control to develop an error signal controlling the energization of the motor. Such closed loop control systems have sensed various facets of the operation to develop operational responsive signals such as, for example, the position of the motor drive shaft or of the object it controls, the speed of the drive shaft rotation or the object it controls, or the counter-electromotive force (CEMF) sensed at the motor armature circuit. In many prior closed loop control systems, the absence of an error signal has indicated that the motor is operating in accordance with the motor command signal which is thus equal to the magnitude of the motor responsive signal. A difference existing between the command and operational responsive signals indicates that the commanded object is either operating too fast or too slow or is not at a proper position and thus an error signal is developed to correspondingly speed up or slow down the drive motor.

Some motor control systems designed for general industrial applications have provided selectively variable closed looped circuits for providing a selectively variable time rate command signal which is combined with a motor responsive signal for providing a motor controlling error signal to accelerate and decelerate the motor as well as operate the motor at a constant speed. One such system has selectively operated a switching comparator for supplying a signal which is integrated in accordance with a preselected rate by an integrating circuit for providing the motor command signal coupled for developing the error signal and further coupled through an inverting circuit to be selectively combined with a run command signal at a summing circuit operatively connected for controlling the operation of the comparator and thus the running and stopping of the motor. While such a system has been highly desirable for controlling D.C. motors used in steel mill process applications, it has not provided the smooth decelerating characteristic desired for passenger comfort in guiding a transport vehicle to a selected landing, such as in an elevator system.

Some prior transportation systems have formulated a vehicle command signal directly in response to a signal received from a tachometer for decelerating a vehicle, such as shown in the U.S. Pat. No. 3,631,326 issued on Dec. 28, 1971. Furthermore, some systems, such as illustrated in the U.S. Pat. No. 3,631,326, provide an acceleration command signal which is compared to a sensed acceleration signal to develop an acceleration error signal to control the energization of an elevator motive means and thus the vehicle movement.

SUMMARY OF THE INVENTION

This invention relates to a transportation system such as an elevator and specifically to an apparatus which supplies a command signal operatively coupled to decelerate a vehicle to stop at a selected landing.

The transportation system of the present invention provides a transport vehicle which is mounted for movement along a guide path structure in a path extending adjacent each of a plurality of landings. A control means cooperates with a motive means to move the vehicle relative to the structure and stop the vehicle at a selected landing. A pattern generating means within the control means operatively controls the operation of the motive means and includes an integrating means providing a vehicle command signal operatively controlling the movement of the vehicle and stopping the vehicle at a selected landing. The pattern generating means includes input means controlling the operation of the integrating means in response to the vehicle command signal and modifying means operatively coupled to the integrating means varies the vehicle command signal while stopping the vehicle in response to the sensed position of the vehicle.

The invention provides a highly desirable pattern generator which supplies a time based velocity command signal modified in response to the sensed position of the vehicle to decelerate the vehicle to stop at a selected landing. Such a modified time based decelerating command signal is combined at a summing circuit with a velocity signal supplied from a tachometer in a preferred construction to provide an error signal coupled to control the motive means and thus the operation of the vehicle. In a preferred construction, a time based velocity command signal which is not modified by the sensed position of the vehicle is supplied to the summing circuit to provide an error signal which commands acceleration and constant velocity of the vehicle and further commands deceleration for a time duration until the vehicle arrives at a predetermined distance from the selected landing at which a stop is to be made. At that instant, the unmodified command signal is disconnected from the summing circuit and the position modified time based velocity command signal is coupled to provide the error signal to continue commanding deceleration of the vehicle to stop at the selected landing.

In another aspect of the invention, a vehicle position monitor senses the arrival of the vehicle at a predetermined plurality of positions along the path spaced from the selected landing at which a stop is to be made. The pattern generating means is operable to supply a vehicle velocity command signal selectively variable from a first predetermined magnitude to a second predetermined magnitude by providing a predetermined number of substantially linear slopes. A modifying means operates in response to the sensed arrival of the vehicle at the predetermined plurality of positions to select a proper one of the predetermined slopes for the vehicle velocity command signal which is combined with a motive means output proportional signal for providing the error signal operatively controlling the operation of the motive means to decelerate the vehicle to stop at the selected landing.

In a preferred form of the invention, the input means to the integrating means provides a switching means selectively operable between a first predetermined magnitude and a second predetermined magnitude to control the magnitude of the vehicle command signal. The switching circuit includes a highly desirable clamping means which defines the first and second predetermined magnitudes supplied to the integrating means thereby providing a well defined vehicle command signal for desirably controlling the movement of the vehicle.

The input means to the integrating means includes summing means providing an analog signal selectively variable according to a preconditioning signal and the vehicle command signal to desirably control the operation of the integrating means. The input means operates to selectively provide a first polarity precondtioning signal in response to vehicle movement in a first direction (such as up travel in an elevator) and a second polarity preconditioning signal in response to vehicle movement in a second direction (such as down travel in an elevator) for providing a proper analog signal. In a preferred construction, the preconditioning signal is selectively connected to the summing means until the integrating means initiates decelerating control of the vehicle in response to the sensed position of the vehicle.

In a preferred construction, feedback means are coupled to the integrating means and to the input means so that the vehicle command signal as sensed at the output of the integrating means is supplied to the input means. A signal is thus supplied to the integrating means from the input means in response to the vehicle command signal providing a decreasing vehicle command signal for operatively controlling the deceleration of the vehicle. The feedback means preferably includes an inverting means operable for providing a vehicle command signal to the input means with the proper polarity to properly control the operation of the integrating means.

The modifying means includes a selectively variable impedance means which modifies the rate of integration of the integrating means in response to the sensed position of the vehicle. In a preferred construction, the impedance means includes a plurality of impedance elements which are selectively connected to the integrating means in accordance with the sensed position of the vehicle. In effect, the modifying means senses a predetermined position of the vehicle spaced from the selected landing and operatively varies the number of the impedance elements which are connected to the integrating means to modify the rate of integration. By operating the integrating means within its substantially linear range of operation, the selective control of the modifying means in response to the sensed position of the vehicle provides the plurality of clearly defined substantially linear slopes which are selected in response to vehicle position. Viewed in another light, the impedance means includes a predetermined number of impedance values while the vehicle is sensed at a predetermined number of positions for selecting an appropriate impedance value corresponding to the particular sensed position to provide an appropriate rate of deceleration and thus an appropriate slope for the vehicle command signal.

In another aspect of the invention, a preconditioning signal is selectively supplied which is operative to provide an integration by the integrating means during the acceleration of the vehicle to provide a predetermined velocity command signal. In a preferred construction, the preconditioning signal generally supplied during the accelerating sequence operatively controls a switching means which, in turn, provides a predetermined output signal for integration by the integrating means in response to the vehicle movement. A switching amplifier operatively responds to the preconditioning signal and supplies an output through a clamping circuit for supplying the controlled signal to be integrated by the integrating means for establishing the first predetermined magnitude velocity command signal.

In a further aspect of the invention, the input means to the integrating means selectively supplies a preconditioning signal during the acceleration of the vehicle and includes summing means providing an analog output signal varying in response to the preconditioning signal and the velocity command signal which operatively controls the operation of the integrating means. Such an analog output signal preferably decreases to a predetermined value in response to the vehicle command signal increasing to the first predetermined magnitude and operatively maintains the first predetermined magnitude of the velocity command signal.

When operatively coupled to control the deceleration of the vehicle in response to the velocity command signal, the integrating means responds to integrate a stepped input to provide the decelerating velocity command signal which decreases to a second predetermined magnitude whereat the vehicle is positioned to stop at the selected landing. In a preferred construction, the selective disconnection of the preconditioning signal from the summing means operatively provides the stepped input to the integrating means in response to the velocity command signal and the vehicle arriving at a predetermined decelerating position spaced from the selected landing.

In another aspect of the invention, a leveling rescue means operatively supplies a rescue signal to the summing circuit in response to vehicle movement beyond the selected landing so that the vehicle command signal operatively controls the return of the vehicle to the selected landing. The rescue means preferably includes switching means which are effective for varying the analog output signal from the summing means from a first polarity to a second polarity in response to the vehicle traveling beyond the selected landing.

A transportation system is thus provided having a highly desirable pattern generator which supplies a vehicle velocity time based command signal modified according to the sensed position of the vehicle which is compared with a signal varying according to the actual sensed velocity of the vehicle for providing an error signal to operatively control the operation of the motive means and thus the velocity of the vehicle.

BRIEF DESCRIPTION OF THE DRAWINGS

The drawings furnished herewith illustrate a preferred construction of the present invention in which the above advantages and features are clearly disclosed, as well as others which will be clear from the following description.

In the drawings:

FIG. 2 is an electric circuit schematic and diagram showing the velocity command and error signal generator and a portion of the supervisory control of FIG. 1; and FIG. 3 is a diagrammatic graphical illustration showing the velocity versus time command signals provided by the velocity command and error signal generator of FIGS. 1 and 2.

DESCRIPTION OF THE PREFERRED ILLUSTRATED EMBODIMENT

Figure 1:
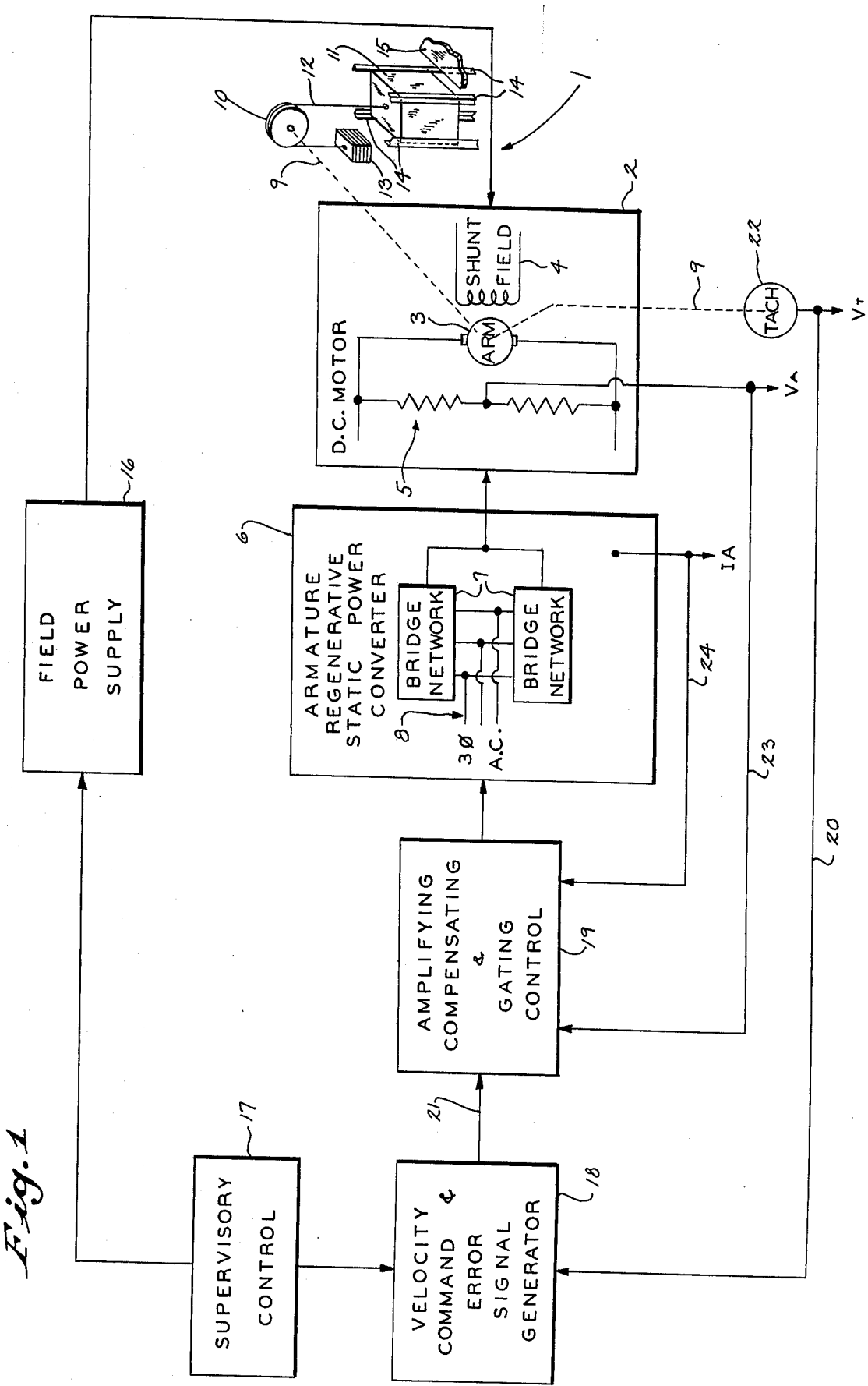
FIG. 1 is a diagrammatical block illustration of an elevator system of the present invention.

Referring to the drawings, FIG. 1 illustrates a transportation system showing several portions of a system in block diagrammatical form which is more fully described in the copending application of J. Maynard having Serial No. 465,271, filed on an even date herewith and entitled "TRANSPORTATION SYSTEM WITH MALFUNCTION MONITOR." With specific reference to FIG. 1, a transportation system includes an elevator system 1 having a direct current drive motor 2 with an armature circuit 3 and a shunt field circuit 4. The armature 3 is connected through an input circuit 5 to an adjustable source 6 of direct current power. The direct current source 6 includes a pair of parallel connected, full wave, controlled bridge rectifying networks 7 which are connected to a three-phase alternating current input 8 and selectively provide controlled amounts of direct current and voltage to the D.C. motor input circuit 5 and thus to the armature 3. The bridge networks include a plurality of controlled rectifier devices which are phase controlled to convert electrical power between alternating and direct current by controlling the conduction or firing angle of the controlled rectifier devices. The utilization and selective control of the controlled rectifiers within the bridge networks 7 permits the direction of direct current flow through the armature circuit 3 to be reversed when desired to provide regenerative braking control as well as forward and reverse operation of the D.C. motor 2. It is understood, however, that source 6 could constitute a direct current motor-generator set in which the field of the generator is controlled to provide the desired magnitude of uni-directional potential.

A drive shaft 9 is diagrammatically illustrated as coupled to be rotatably driven by the armature 3 and is connected to rotate a traction sheave 10 either directly or through suitable gears (not shown). An elevator car 11 is supported by a cable 12 which is reeved over the traction sheave 10, with the other end of cable 12 being connected to a counterweight 13. The elevator car 11 is movably disposed in a hoist way which includes a number of guide rails 14 to provide service to a plurality of floors, such as floor 15. The movement of car 11 in its required travel between one or more floors is precisely controlled to provide a smooth and comfortable ride in a minimum amount of time by controlling the amount and direction of direct current flow to the armature 3 of the drive motor 2. The shunt field 4 of the D.C. motor 2 is connected to a field power supply 16 which supplies energizing power to the shunt field under the control of a supervisory control 17. The supervisory control 17 may desirably function to control the operation of a single car or may be coupled to operate a plurality of cars in any known manner.

The magnitude and direction of direct current flow applied to armature 3 by the source 6 is controlled by the velocity command and error signal generator 18 in response to a command from the supervisory control 17 as applied through an amplifying, compensating and gating control circuit 19. The generator 18 develops a plurality of vehicle speed pattern commands which are selectively summed with a speed responsive signal $V_T$ appearing at lead 20 to provide an error speed signal output at 21 as described more fully hereinafter. A tachometer 22 is coupled to the drive shaft 9 of a D.C. motor 2 and supplies a speed responsive signal $V_T$ to lead 20 which is directly proportional to the speed of rotation of shaft 9 and the velocity of car 11.

The amplifying, compensating and gating control circuit 19 is connected to a lead 23 which supplies a signal $V_A$ from the armature input circuit 5 which is proportional to the armature voltage and is further connected to lead 24 which supplies a signal $I_A$ from the source 6 which is proportional to the armature current. Generally, the armature current signal $I_A$ and the armature voltage signal $V_A$ are supplied to the compensating circuits within 19 to compensate for motor operating losses while providing a continuous armature current limit. The circuit 19 further provides a gating control which selectively enables the dual bridge networks 7 for providing controlled amounts of both forward and reverse direction energizing power to the armature circuit 3 according to the selective firing of the control rectifiers in the network 7 in accordance with the phase relationship of the incoming three-phase power supply.

The velocity command and error signal generator 18 along with a portion of the supervisory control 17 is illustrated in schematic form in a preferred embodiment in FIG. 2. The supervisory control 17 is more fully described in the copending application of J. Maynard filed on an even date herewith and entitled "TRANSPORTATION SYSTEM WITH MALFUNCTION MONITOR." As diagrammatically illustrated in FIG. 2, the supervisory control 17 includes a number of relays which are operatively connected between a constant positive potential D.C. voltage source +VDC and a constant negative potential D.C. voltage source −VDC for selective operation. Specifically, a down direction auxiliary relay DX is connected in circuit for selective energization through an open switch 25, an up direction auxiliary relay UX is connected in circuit for selective energization through an open switch 26, a high speed leveling relay LVX is connected in circuit for selective energization through an open switch 27, a second leveling auxiliary relay 2LX is connected in circuit for selective energization through an open switch 28, a third leveling auxiliary relay 3LX is connected in circuit for selective energization through an open switch 29, a fourth leveling auxiliary relay 4LX is connected in circuit for selective energization through an open switch 30, and a fifth kill relay K5X is connected in circuit for selective energization through an open switch 31. The switches 25 through 31, inclusive, are only displayed for illustration and are preferably replaced by normally open and normally closed contacts of various associated relays which automatically respond to various conditions within the system to provide automatic control as more fully described in the copending application of J. Maynard, filed on an even date herewith and entitled "TRANSPORTATION SYSTEM WITH MALFUNCTION MONITOR."

The high speed leveling relay LVX is generally controlled by the normally closed contacts of the up and down leveling zone relays so that the relay LVX is energized while the car is traveling from one floor to another and drops or de-energizes when the car approaches to within 20 inches of a landing at which a stop is to be made. The contacts LVX-1 are thus closed during most of the running sequence between floors to connect a velocity command pattern signal supplied from a velocity pattern command generator 32 to a summing circuit 33 through a resistor 34 while the contacts LVX-2 remain open.

As the car reaches to within 20 inches of a landing at which it is to stop, the contacts LVX-1 open and the contacts LVX-2 close in response to the de-energization of the relay LVX to connect a leveling and releveling pattern command circuit 35 to the summing circuit 33 through a resistor 36. The velocity pattern command generator 32 is shown and more fully described in the copending application of C. Young and J. Maynard having Ser. No. 465,270, filed on an even date herewith and entitled "CONTROL SYSTEM FOR A TRANSPORTATION SYSTEM."

The speed responsive signal $V_T$ supplied on the lead 20 from the tachometer 22 is supplied to the summing circuit 33 through a resistor 37 and is selectively summed with either the velocity command signal supplied from the generator 32 or the velocity command signal supplied from the generator 35 in accordance with the operation of the high speed leveling relay LVX to provide a velocity error output signal on lead 38 which is amplified and regulated by the amplifier 39 to supply an amplified error signal to the amplifying, compensating and gating control circuit 19 on the lead 21 for controlling the operation of the motor 2.

The leveling and releveling command circuit 35 includes a summing circuit 40 which selectively receives a preconditioning signal from a preconditioning circuit 41 and a releveling signal from the leveling rescue command circuit 42 as controlled by a directional responsive circuit 43. Specifically, a constant potential positive voltage source +VDC is selectively connected to the summing circuit 40 through the normally open contacts DX-3 of the down direction auxiliary relay DX, the serially connected resistors 44 and 45, the normally open contacts LVX-3 of the high speed leveling relay and a resistor 46. A constant potential negative voltage source −VDC is also selectively connected to the summing circuit 40 through the normally open contacts UX-3 of the up direction auxiliary relay, the serially connected resistors 47 and 48, the contacts LVX-3 and the resistor 46. A junction circuit 49 coupling the resistors 44 and 45 is also coupled to the system ground 50 through a Zener diode 51 while a junction circuit 52 connecting resistors 47 and 48 is likewise coupled to the system ground 50 through a Zener diode 53.

The leveling rescue command circuit 42 includes a resistor 54 connected to the summing circuit 40 and is further connected to the connecting circuit 49 through a resistor 55 and to the connecting circuit 52 to a resistor 56.

An output circuit 57 of the summing circuit 40 is connected to the inverting input 58 of a high gain operational amplifier 59 which operates as a comparator to provide a switching amplifier having a non-inverting input 60 connected to the system ground through a resistor 61. A pair of opppositely orientated diodes 62 and 63 are connected between the input circuits 58 and 60 for circuit protection against excessive abnormal transient conditions. An output circuit 64 of the switching amplifier 59 is coupled to the inverting input 58 through a parallel connected capacitor 65 and resistor 66 which are designed to stabilize the operation of the amplifier 59 and permit a saturated output at lead 64 in response to a comparatively small input at 58.

A clamping circuit 67 is coupled to the output circuit 64 of the switching amplifier 59 and includes the serially connected resistors 68 and 69 with the connecting circuit 70 coupled to the system ground through a pair of serially connected and oppositely oriented Zener diodes 71 and 72 while the output circuit 73 is connected to the system ground through the serially connected and oppositely orientated Zener diodes 74 and 75.

A variable impedance circuit 76 is connected to the output circuit 73 of the clamping circuit 67 and to an integrating circuit 77. Specifically, a resistor 78 having a selectively variable tap 79 to be manually preset is connected to the circuit 73 and is also serially connected to the serially connected resistors 80, 81, 82 and 83. The resistor 81 is connected in parallel with the normally open contacts 2LX-1 of the second leveling auxiliary relay and the resistor 84 having an adjustable tap 85 to be manually preset. The resistor 82 is connected in parallel with the normally open contacts 3LX-1 of the third leveling auxiliary relay and the resistor 86 having a variable tap 87 to be maanually preset. The resistor 83 is connected in parallel with the normally open contacts 4LX-1 of the fourth leveling auxiliary relay.

The resistor 83 is connected to an inverting input 88 of an operational amplifier 89 providing an output circuit 90 coupled to the inverting input circuit 88 through an integrating capacitor 91. The capacitor 91 is parallel connected to a resetting circuit 92 which includes a serially connected resistor 93, the normally closed contacts K5X-1 of the fifth kill relay and a resistor 94. A non-inverting input 95 to the operation amplifier 89 is coupled to the system ground through a resistor 96 and a parallel connected circuit including a serially connected resistor 97 and a capacitor 98.

The output circuit 90 of the integrator 77 is connected to the summing circuit 33 through the normally closed contacts LVX-2 and the resistor 36 and is further connected to the summing circuit 40 through a feedback circuit 99. The feedback circuit 99 includes an inverter 100 which includes an operational amplifier 101 having an inverting input 102 connected to the output lead 90 through a resistor 103 while a non-inverting input 104 is connected to the system ground through a resistor 105. The inverting amplifier 101 further provides an output 106 which is coupled to the inverting input 102 through a parallel connected capacitor 107 and resistor 108 for stabilizing the inverter operation. The output circuit 106 is coupled to the summing circuit 40 through a serially connected resistor 109 having a variable tap 110 and a resistor 111.

The operation of the system will be briefly described according to the movement of the transport vehicle from one landing to another landing under the control of the velocity command and error signal generator 18. Upon initiation of a command for vehicle movement, the high speed leveling relay LVX is energized to close the contacts LVX-1 and open the contacts LVX-2 so that a velocity pattern command signal is supplied from the generator 32 to the summing circuit 33 and combined with the speed signal $V_T$ for providing an amplified error signal at output 21 for operatively controlling the operation of the motor 2 to accelerate the vehicle and possibly operate the vehicle at a constant velocity or speed and also to initiate a decelerating sequence for stopping at a landing.

With reference to the graphical representation shown in FIG. 3, the velocity command signals supplied to the summing circuit 33 are illustrated as voltage wave forms displayed as functions in the ordinate axis versus time in the absisis axis. The velocity command signal supplied from the generator 32 is illustrated in phantom at 112 and controls the acceleration of the vehicle from zero velocity at time $t_0$ to a predetermined maximum velocity $v_C$ at time $t_2$ and further operates to initiate a decelerating sequence at time $t_3$ in response to the vehicle being sensed at a predetermined position spaced from a selected landing at which a stop is to be made. The velocity pattern command signal supplied from the generator 32 as illustrated at 112 continues to operatively control the deceleration of the vehicle until the time $t_4$ at which the car is sensed at a position spaced from the selected landing by a predetermined distance, such as twenty inches, from the landing at which a stop is to be made. Thus at time $t_4$, the high speed leveling relay LVX deenergizes in response to the sensed position of the vehicle at twenty inches from the selected landing at which a stop is to be made thereby opening the contacts LVX-1 and disconnecting the generator 32 from effective operative control of the vehicle while closing the contacts LVX-2 to selectively connect the decelerating pattern generator 35 for operatively controlling the vehicle deceleration and movement.

For the purposes of illustration, we will assume that the transport vehicle is controlled to travel from an eighth floor of a building structure to a sixth floor at which a stop is to be made. The supervisory control 17 operates to initiate vehicle movement so that switch 31 closes to energize the fifth kill relay K5X thus opening the contacts K5X-1 to condition the integrator 77 for operation. In like manner, the switches 28, 29 and 30 close to energize the second, third and fourth zone releveling relays 2LX, 3LX and 4LX, respectively, thereby closing the contacts 2LX-1, 3LX-1 and 4LX-1, respectively, to effectively provide a short circuit across the resistors 81 through 84 and 86. The switch 27 closes to energize the high speed leveling relay LVX which opens the contacts LVX-2 to operatively disconnect the pattern circuit 35 and closes the contacts LVX-1 to operatively connect the pattern generator 32 to the summing circuit 33 for effective operative control over the vehicle.

The energization of the high speed leveling relay LVX also closes the contacts LVX-3 while the movement of the vehicle in the down direction is accomplished by closing the switch 25 to energize the down direction auxiliary relay DX thus closing the contacts DX-3. A preconditioning signal is supplied in response to commanded movement in a down direction through the closed contacts DX-3 to the summing circuit 40 through the resistors 44, 45 and 46 and the closed contacts LVX-3. A releveling rescue command signal is also supplied at the same time to the summing circuit 40 through resistors 54 and 55 which is substantially small in comparison with the preconditioning signals supplied through the resistor 46. In any event, the two signals supplied through resistors 46 and 54 are combined to provide an analog output at lead 57 for controlling the operation of the switching amplifier 59.

The switching amplifier 59 is operated to provide a saturated output at lead 64 in response to a very small analog signal at input 58 so that the preconditioning signal supplied through resistor 46 immediately saturates the amplifier 59 and provides a saturated output at lead 64. As an example, the switching amplifier 59 can be constructed so that a small 100 millivolt input signal at lead 58 provides a saturated output at lead 64, such as 12 volts for example. The clamping circuit 67, however, responds to the 12 volt saturated output at lead 64 and provides a substantially lower clamp voltage output at lead 73, such as 2.7 volts for example.

The constant clamped output supplied at lead 73 of the clamping circuit 67 is supplied to the integrating circuit 77 through resistors 78 and 80 and the closed contacts 2LX-1, 3LX-1 and 4LX-1 thus providing a substantially constant stepped input signal at lead 88 which is integrated by the integrator 77 to provide an output signal at the output lead 90 as illustrated at 113 in FIG. 3. The signal 113 on lead 90 is inverted and supplied to the summing circuit 40 by the feedback circuit 99 and opposes the inputs supplied through the resistors 46 and 54 thus decreasing the analog signal at lead 57 supplied to the switching amplifier 59. When the analog signal upon the lead 57 decreases to a substantially low level, such as 100 millivolts for example, the switching amplifier 59 will come out of saturation and the output signal at the lead 64 will start to decrease in response to the decrease of the analog signal at lead 57. The initial decrease in the output signal at lead 64, however, does not decrease the constant stepped input to the integrator 77 because of the clamping circuit 67. When the analog signal at input lead 57 decreases to a substantially low level, such as 20 millivolts for example, the output of the switching amplifier 59 at 64 will decrease to the clamped magnitude of the constant stepped output supplied by the clamping circuit 67.

The operation of the switching amplifier 59 with the clamping circuit 67 thus provides a substantially constant stepped input for integration by the integrator 77 while the analog signal at lead 57 is permitted to vary over a wide range. Such a stepped input to the integrator 77 provides a substantially linear output at 90 as illustrated at 114 in FIG. 3. As the analog signal at lead 57 decreases below the substantially low level, such as below 20 millivolts for example, due to the signal at lead 90 being fedback to the summing circuit 40, the output at lead 64 will decrease below the clamped voltage level of the clamping circuit 67, such as 2.7 volts for example, so that the varying decreasing analog signal at lead 57 will vary the input to the integrator 77 thereby permitting the output at lead 90 to round off as at 115 to provide a substantially constant output $v_d$. In other words, the integrator 77 integrates the stepped input signal at lead 88 to provide a substantially linear output signal 114 at lead 90 until the output signal at 90 approaches the value $v_d$ at which time the signal feedback through the feedback circuit 99 becomes almost equal to the summed signals supplied through resistors 46 and 54. Thus at time $t_1$, the integrating circuit 77 maintains a constant output $v_d$ established by the steady state condition of the summing circuit 40 providing a very small or substantially zero output at lead 57 to cease the integration. It is sometimes desirable to maintain a small analog signal at lead 57 and thus a small input to the integrator 77 in order to maintain the constant output $v_d$ to compensate for offset conditions and losses frequently encountered within integrating circuits to provide a highly regulated and substantially constant output signal $v_d$ at the output lead 90 of the integrator 77. The operation of the integrator 77 to provide the constant output $v_d$ at lead 90 generally occurs prior to the time $t_2$ while the car is accelerating to the maximum velocity limitation $v_c$.

During a period of time before the time $t_4$, the velocity pattern command generator 32 operatively decelerates the vehicle from the velocity $v_c$ to a lower velocity which generally equals the velocity $v_d$ at the time $t_4$ when the car reaches a position spaced 20 inches from the selected landing at which the stop is to be made, which is the sixth floor in the present illustrated example.

At time $t_4$, the contacts LVX-1 open and the contacts LVX-2 close and the decelerating vehicle command generator 35 is connected to supply a velocity command signal through the resistor 36 to the summing circuit 33 to provide the sole control over the vehicle while the generator 32 is completely disconnected and no longer controls the movement of the vehicle. At the time $t_4$, the contacts LVX-3 open to disconnect the preconditioning signal supplied from the circuit 41. The inverted signal fedback through the inverting circuit 100 from the output 90 of the integrator 77 opposes the signal supplied through the resistor 54 so that the analog signal at lead 57 at time $t_4$ appears as a stepped negative input into the summing circuit 40. The switching amplifier 59 operatively switches in response to the negative stepped input to provide an opposite polarity saturated output at lead 64. The clamping circuit 67 operates as previously described with respect to the preconditioning signal and provides a stepped input only of the opposite polarity to input lead 88 through resistors 78, 80 and the closed contacts 2LX-1, 3LX-1 and 4LX-1 so that the integrating circuit 77 provides a substantially linear declining output at lead 90 as illustrated by the signal 116 in FIG. 3. The slope of the signal 116 is substantially linear in that the integrating circuit 77 is only permitted to operate within a substantially linear region as previously described.

At time $t_5$, the vehicle is sensed at a second predetermined position spaced from the selected landing at which a stop is to be made, such as ten inches from the landing for example, and operatively opens the switch 28 to de-energize or drop the second leveling auxiliary relay 2LX to open the contacts 2LX-1. The resistors 81 and 84 are thus placed in circuit with the resistors 78 and 80 to vary the input resistance to the amplifier 89 and thus the time constant established with the integrating capacitor 91 to provide an output signal 117 at lead 90 which is substantially linear and has a second predetermined slope differing from the predetermined slope of signal 116.

At the time $t_6$, the vehicle is sensed at a third predetermined position spaced from the selected landing, such as five inches for example, and operatively opens the switch 29 to de-energize the third leveling auxiliary relay 3LX and open the contacts 3LX-1. The resistors 82 and 86 are thus connected in circuit with the input resistors 78, 80, 81 and 84 to further vary the time constant of the integrating circuit 77 to provide an output signal 118 at lead 90 having a third predetermined substantially linear slope differing from the slopes of signal 116 and 117.

At time $t_7$, the vehicle is sensed at a fourth predetermined position spaced from the selected landing, such as 2 ½ inches for example, and operatively opens the switch 30 to de-energize the fourth leveling auxiliary relay 4LX and open the contacts 4LX-1. The resistor 83 is thus added into circuit along with the resistors 78, 80 through 82, 84 and 86 to further vary the time constant of the integrating circuit 77 to provide the output signal 119 at lead 90 which is substantially linear and having a slope differing from the slopes of signals 116, 117 and 118.

The decelerating velocity command signal 113 as defined by the slopes 116, 117, 118 and 119 supplied at the output lead 90 of integrator 77 progressively decreases so that the inverted signal summed with the input supplied through the resistor 54 is effective for reducing the analog signal appearing at lead 57. Because of the operation of the switching amplifier 59 and the clamping circuit 67, the input supplied to the integrator 77 remains as substantially constant stepped signals through the time periods $t_4$ through $t_7$ and during a major portion of the time between $t_7$ and $t_8$.

In other words, the stepped input signal supplied from lead 73 will be maintained at a substantially constant level from time $t_4$ through $t_7$ and almost until $t_8$ at which time the analog signal at lead 57 decreases to the illustrated 20 millivolt level thereby decreasing the signal supplied at lead 73 at which time the car has substantially come to a stop at the selected sixth floor landing.

When the analog signal at lead 57 decreases to a very low or substantially zero level, the operation of integrator 77 will stop and the vehicle will be positioned adjacent to the selected sixth floor landing in a condition for discharging passengers at the time $t_8$. The highly novel employment of the clamping circuit 67 in combination with the switching amplifier 59 and the feedback circuit 99 maintains the stepped input to the integrating circuit 77 as modified by the variable impedance circuit 76 in response to the sensed vehicle position until the analog signal appearing at lead 57 decreases to a very low value, such as below 20 millivolts for example, so the velocity command signal 113 during deceleration provides the plurality of substantially linear slopes 116 through 119.

In the case of an abnormal and unlikely circumstance if the vehicle traveling beyond the selected landing at which a stop was to be made, the leveling rescue command circuit 42 operatively supplies an input signal of the proper polarity to the summing circuit 40 for providing a vehicle command signal at lead 90 commanding the return or the vehicle to the selected landing for stopping. Suppose that the car is traveling to the sixth floor came to a stop slightly below the sixth floor level the contacts DX-3 of the down direction auxiliary relay would open and the contacts UX-3 of the up direction auxiliary relay would close to provide a negative polarity signal through the resistors 54 and 56 to the summing circuit 40 thereby operatively supplying a negative input to integrator 77 which, in turn, provides a vehicle command signal at output 90 to command a return of the vehicle to the sixth floor to stop at the selected landing.

After the vehicle has stopped at the sixth floor landing, the switch 31 opens to de-energize the relay K5X and close the contacts K5X-1 is disable the pattern generator 35. In a similar manner, the switches 25 through 30 open to reset the pattern generator 32 and 35 for the next sequence of operation in either the up or down directions.

A highly desirable decelerating pattern generating circuit is provided which is effective for decelerating the vehicle by providing a velocity command signal which provides a plurality of well-defined slopes dictated by the relative sensed position of the vehicle. While the invention has been defined in the preferred illustrated embodiment as providing decelerating control over only a portion of the decelerating range of the vehicle, it is possible to utilize applicants' pattern generator 35 to provide the entire decelerating control for the vehicle.

Portions of the disclosure herein are more fully described in the copending applications filed on an even date herewith of Maynard entitled "TRANSPORTATION SYSTEM WITH MALFUNCTION MONITOR" and Young et al entitled "CONTROL SYSTEM FOR A TRANSPORTATION SYSTEM" and such applications are incorporated by reference herein.

Various modes of carrying out the invention are contemplated as being within the scope of the following claims particularly pointing out and distinctly claiming the subject matter which is regarded as the invention.

We claim:

1. A transportation system including a guide path structure and a plurality of spaced landings and a transportation means comprising a transport vehicle, means mounting said vehicle for movement relative to said structure in a path extending adjacent each of said landings, motive means moving said vehicle relative to said structure, means responsive to an output of said motive means and providing an output proportional signal, means sensing the position of said vehicle, and control means cooperating with said motive means and moving said vehicle relative to said structure and stopping said vehicle at a selected landing and including pattern generating means operatively controlling the operation of said motive means, said pattern generating means including integrating means having an output providing a vehicle command signal and input means operatively connected to said output and receiving said vehicle command signal and operatively supplying an input responsive to said vehicle command signal to said integrating means and modifying means operatively coupled to said integrating means and varying said vehicle command signal in response to the sensed position of said vehicle, said control means including means receiving said vehicle command signal and said output proportional signal and providing an error signal operatively controlling the movement of said vehicle and stopping said vehicle at a selected landing.

2. The system of claim 1, wherein said modifying means includes a selectively variable impedance means modifying the rate of integration of said integrating means in response to the sensed position of said vehicle.

3. The system of claim 2, wherein said impedance means includes a plurality of impedance elements selectively connected to said integrating means and said position sensing means operatively sensing said vehicle at a predetermined position spaced from said selected landing and operatively varying the number of said impedance elements connected to said integrating means to modify the rate of integration.

4. The system of claim 2, wherein said impedance means includes a predetermined number of impedance values and said sensing means operatively senses said vehicle at a predetermined number of positions and selects an appropriate impedance value corresponding to one of said sensed positions to provide an appropriate rate of integration.

5. The system of claim 1, wherein said input means includes switching means providing an output coupled to said integrating means and selectively operable between a first predetermined magnitude and a second predetermined magnitude and operatively controlling the magnitude of ssaid vehicle command signal.

6. The system of claim 5, wherein said switching means includes clamping means providing said first and second predetermined magnitudes.

7. The system of claim 1, wherein said input means includes summing means providing an analog signal selectively varying according to a preconditioning signal and said vehicle command signal and operatively controlling the operation of said integrating means.

8. The system of claim 7, wherein said input means selectively provides a first polarity preconditioning signal in response to vehicle movement in a first direction and a second polarity preconditioning signal in response to vehicle movement in a second direction to provide said analog signal.

9. The system of claim 7, wherein said preconditioning signal is selectively connected to said summing means until said integrating means initiates decelerating control of said vehicle in response to the sensed position of said vehicle.

10. The system of claim 1, wherein said input means is operatively coupled to said integrating means and operatively supplies a signal to be integrated by said integrating means in response to said vehicle command signal providing a decreasing vehicle command signal operatively controlling the deceleration of said vehicle.

11. The system of claim 10, and including feedback means coupled to said integrating means and to said input means and supplying said vehicle command signal to said input means.

12. The system of claim 11, wherein said feedback means includes inverting means operating to provide the proper polarity of said vehicle command signal supplied to said input means.

13. A transportation system including a guide path structure and a plurality of spaced landings and a transportation means comprising a transport vehicle, means mounting said vehicle for movement relative to said structure in a path extending adjacent each of said landings, motive means moving said vehicle relative to said structure, means responsive to an output of said motive means and providing an output proportional signal, means sensing the arrival of said vehicle at a predetermined plurality of positions along said path spaced from selected landing at which a stop is to be made, and control means cooperating with said motive means and moving said vehicle relative to said structure and stopping said vehicle at said selected landing and including means providing a vehicle velocity command signal selectively variable from a first predetermined magnitude to a second predetermined magnitude by providing a predetermined number of substantially linear slopes and including modifying means operating in response to the sensed arrival of said vehicle at said predetermined plurality of positions to select a proper one of said predetermined slopes and means receiving said vehicle velocity command signal and said output proportional signal and providing an error signal operatively controlling the operation of said motive means and decelerating said vehicle for a stop at said selected landing.

14. The system of claim 13, wherein said control means includes input means operatively receiving said vehicle command signal and operatively controlling the operation of said velocity command signal providing means.

15. The system of claim 13, wherein said control means includes integrating means providing said velocity command signal.

16. The system of claim 15, wherein said control means includes input means selectively supplying a preconditioning signal operatively coupled to control the operation of said integrating means during the acceleration of said vehicle and providing said first predetermined magnitude velocity command signal.

17. The system of claim 16, wherein said input means includes switching means operatively receiving said preconditioning signal and providing a predetermined magnitude output signal integrated by said integrating means in response to vehicle movement to provide said first velocity command signal.

18. The system of claim 17, wherein said switching means includes a switching amplifier having an output and a clamping circuit connected to said output.

19. The system of claim 15, wherein said control means includes input means selectively supplying a preconditioning signal during the acceleration of said vehicle and including summing means providing an analog output signal varying in response to said preconditioning signal and said velocity command signal operatively controlling the operation of said integrating means.

20. The system of claim 19, wherein said input means includes switching means operatively receiving said analog signal and providing a predetermined magnitude output signal integrated by said integrating means in response to vehicle movement.

21. The system of claim 20, wherein said analog output signal decreases to a predetermined value in response to said velocity command signal increasing to said first predetermined magnitude operatively coupled to maintain said first predetermined magnitude.

22. The system of claim 13, wherein said control means includes integrating means preconditioned to provide said first predetermined magnitude velocity command signal and means providing a stepped input integrated by said integrating means and providing a decelerating velocity command signal decreasing to said second predetermined magnitude.

23. The system of claim 22, wherein said control means includes input means including summing means providing an analog output signal varying in response to a constant preconditioning signal and said velocity command signal controlling the operation of said integrating means and providing said first predetermined magnitude vehicle command signal during initial vehicle movement from a landing, said preconditioning signal selectively removed from said summing means and providing said stepped input to said integrating means in response to said vehicle arriving at a predetermined decelerating position spaced from said selected landing.

24. A transportation system including a guide path structure having a plurality of spaced landings and a transportation means comprising a transport vehicle, means mounting said vehicle for movement relative to said structure in a path extending adjacent each of said landings, motive means moving said vehicle relative to said structure, means responsive to an output of said motive means and providing an output proportional signal, and control means cooperating with said motive means and moving said vehicle at a selected landing and including pattern generating means having an integrator providing a vehicle velocity command signal and a summing circuit receiving said vehicle command signal through a feedback circuit and a preconditioning signal from an input command circuit in response to vehicle movement and providing an analog output signal operatively controlling a switching circuit having an output coupled to a clamping circuit and selectively providing first and second stepped signals which are integrated by said integrator in response to said analog signal, said control means including means receiving said velocity command signal and said output proportional signal and providing an error signal operatively controlling the movement of said vehicle and stopping said vehicle at a selected landing.

25. The system of claim 24, and including means sensing the arrival of said vehicle at a predetermined plurality of positions along said path spaced from said selected landing and said pattern generating means including a gain-setting circuit connected to said integrator and selectively operable to provide a selected one of a predetermined number of substantially linear slopes for said vehicle command signal in response to the sensed arrival of said vehicle at said predetermined plurality of positions.

26. The system of claim 24, and including means supplying a rescue signal to said summing circuit in response to said vehicle traveling beyond said selected landing and said vehicle command signal operatively moving said vehicle to said selected landing.

27. The system of claim 26, wherein said rescue means includes switching means operable for varying said analog signal from a first polarity to a second polarity in response to said vehicle traveling beyond said selected landing.

* * * * *

UNITED STATES PATENT AND TRADEMARK OFFICE
CERTIFICATE OF CORRECTION

PATENT NO. : 3,948,357
DATED : April 6, 1976
INVENTOR(S) : John T. Maynard and Christopher Young It is certified that error appears in the above-identified patent and that said Letters Patent are hereby corrected as shown below:

| | |
|---|---|
| Column 7, Line 63, | Cancel "oriented" and substitute therefor ---orientated---; |
| Column 8, Line 13, | Cancel "maanually" and substitute therefor ---manually---; |
| Column 12, Line 51, | Cancel "is" and substitute therefor ---to---; |
| Column 13, Line 63, CLAIM 5 | Cancel "ssaid" and substitute therefor ---said---; |

Signed and Sealed this

Eleventh Day of January 1977

[SEAL]

*Attest:*

RUTH C. MASON
*Attesting Officer*

C. MARSHALL DANN
*Commissioner of Patents and Trademarks*